(12) United States Patent
Kizu et al.

(10) Patent No.: US 8,854,585 B2
(45) Date of Patent: Oct. 7, 2014

(54) LIQUID CRYSTAL DISPLAY EXHIBITING KERR EFFECT COMPRISING ELECTRODES HAVING COMBTOOTH PORTIONS THAT INCLUDE A FIRST CONVEX SURFACE WITH A RIDGE SHAPE

(75) Inventors: Yuko Kizu, Yokohama (JP); Rei Hasegawa, Yokohama (JP); Hajime Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 91 days.

(21) Appl. No.: 13/241,358

(22) Filed: Sep. 23, 2011

(65) Prior Publication Data
US 2012/0069283 A1    Mar. 22, 2012

Related U.S. Application Data

(63) Continuation of application No. PCT/JP2010/054865, filed on Mar. 19, 2010.

(30) Foreign Application Priority Data

Mar. 25, 2009 (JP) ................................. 2009-073904

(51) Int. Cl.
G02F 1/1343 (2006.01)
G02F 1/1337 (2006.01)
G02F 1/137 (2006.01)

(52) U.S. Cl.
CPC *G02F 1/133707* (2013.01); *G02F 2001/13793* (2013.01); *G02F 1/134363* (2013.01); *G02F 2201/124* (2013.01)
USPC .......................................... 349/141; 349/139

(58) Field of Classification Search
CPC .............. G02F 1/134336; G02F 2001/134372; G02F 2001/134345

USPC .......................................... 349/139, 141–144
See application file for complete search history.

(56) References Cited

U.S. PATENT DOCUMENTS 6,266,109 B1    7/2001 Kawata et al.
2002/0044248 A1 *    4/2002 Park et al. ..................... 349/141
(Continued)

FOREIGN PATENT DOCUMENTS

JP    2005-202390 A    7/2005
JP    2005-316013    11/2005
(Continued)

OTHER PUBLICATIONS

Japanese Office Action issued Jul. 17, 2012 in Patent Application No. 2009-073904 with English Translation.

(Continued)

*Primary Examiner* — Paul Lee
(74) *Attorney, Agent, or Firm* — Oblon, Spivak, McClelland, Maier & Neustadt, L.L.P.

(57) ABSTRACT

According to one embodiment, a liquid crystal display includes a liquid crystal layer exhibiting Kerr effect, a first electrode including combtooth portions, a second electrode, and protruding portions facing a main surface of the liquid crystal layer with at least one of the first and second electrodes interposed therebetween. The combtooth portions each extends in a first direction and are arranged in a second direction. The second electrode includes a portion that faces the main surface and is positioned in a gap between the combtooth portions or faces the main surface with the gap interposed therebetween. The protruding portions each extends in the first direction and are arranged in the second direction. Each of the first protruding portions forms a convex surface having a ridge shape on a surface of the combtooth portion or a surface of the portion of the second electrode positioned at the gap.

11 Claims, 13 Drawing Sheets

(56) References Cited

U.S. PATENT DOCUMENTS

| | | | |
|---|---|---|---|
| 2008/0100764 A1* | 5/2008 | Haruyama | 349/43 |
| 2009/0219478 A1* | 9/2009 | Park et al. | 349/155 |
| 2010/0053490 A1* | 3/2010 | Kang et al. | 349/48 |
| 2010/0079700 A1 | 4/2010 | Hasegawa et al. | |

FOREIGN PATENT DOCUMENTS

| | | |
|---|---|---|
| JP | 2007-86205 A | 4/2007 |
| JP | 2007-271839 | 10/2007 |
| JP | 2009-145865 | 7/2009 |

OTHER PUBLICATIONS

International Search Report issued Jun. 22, 2010 in PCT/JP10/054865 filed Mar. 19, 2010 ( (with Translation of Categories).
Written Opinion issued Jun. 22, 2010 in PCT/JP10/054865 filed Mar. 19, 2010.
U.S. Appl. No. 13/586,947, filed Aug. 16, 2012, Kizu, et al.
Japanese Office Action issued Oct. 16, 2012 in Patent Application No. 2009-073904 with English Translation.

* cited by examiner

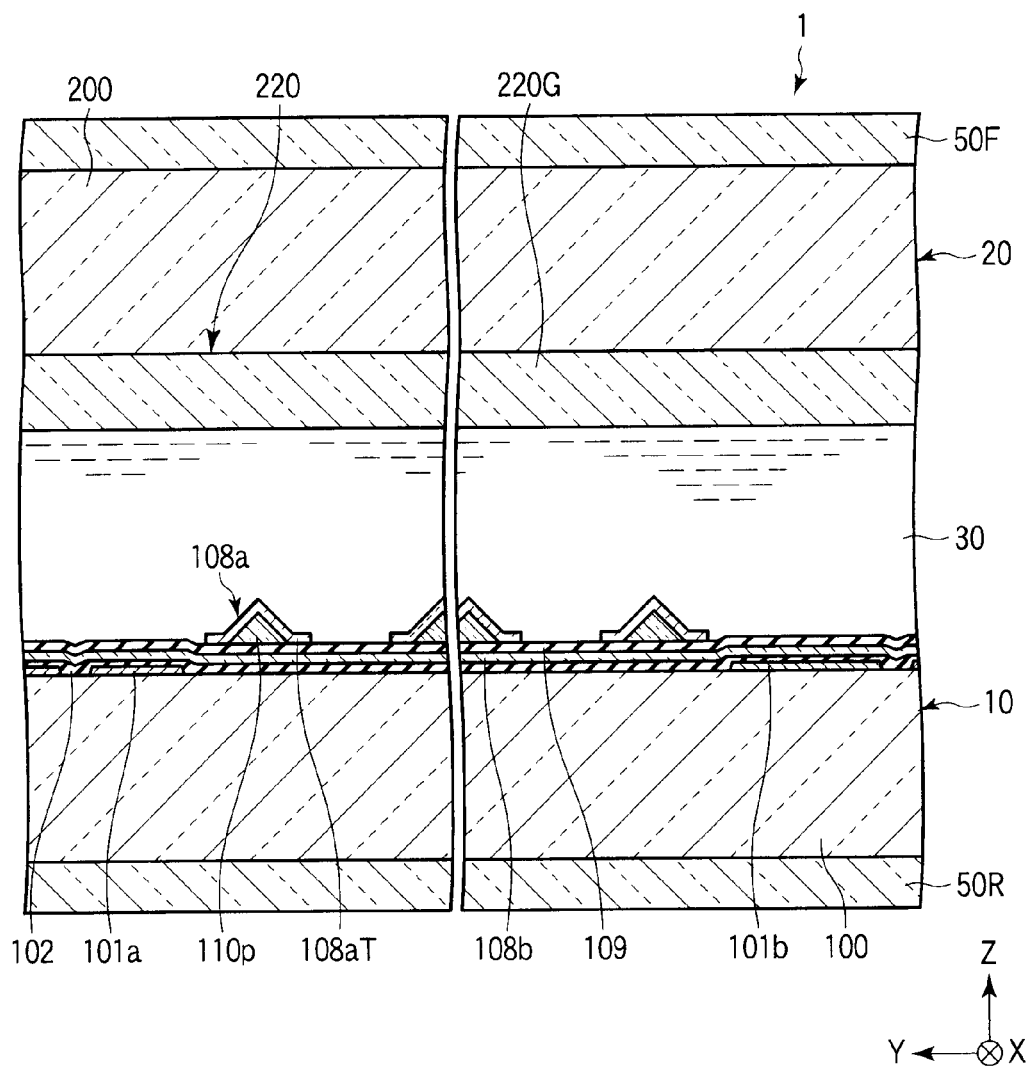
F I G. 4

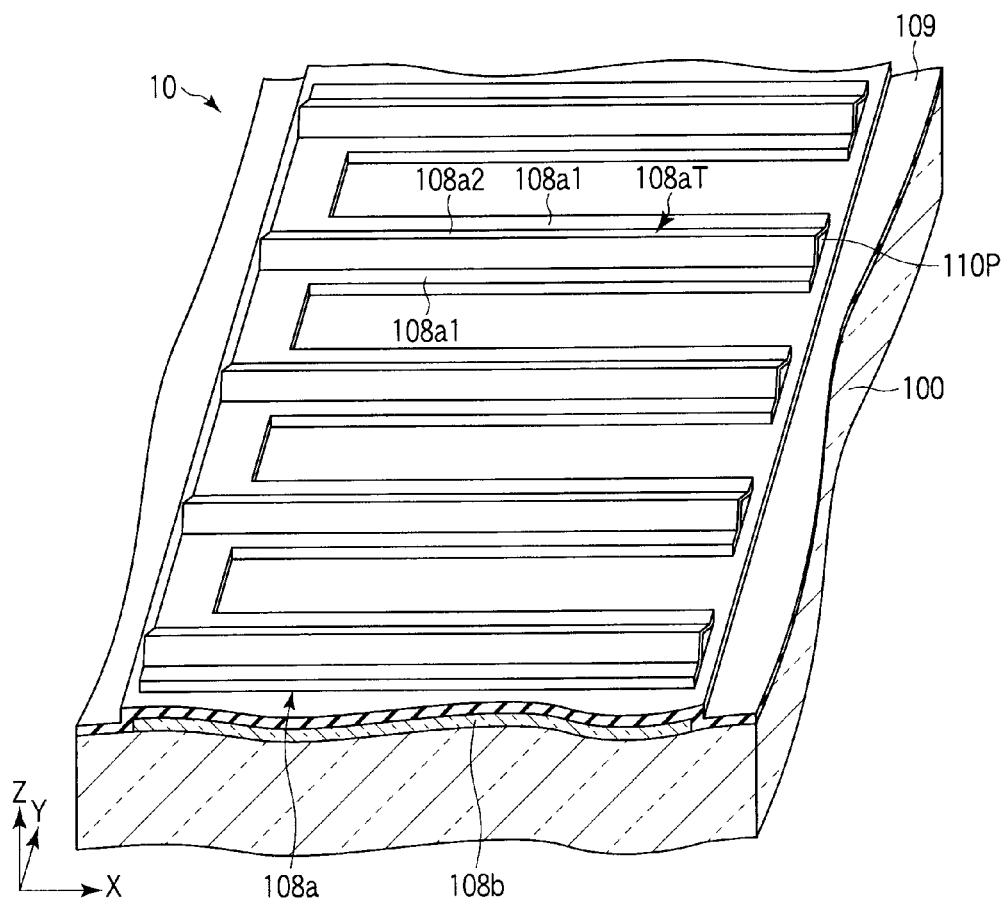
F I G. 5

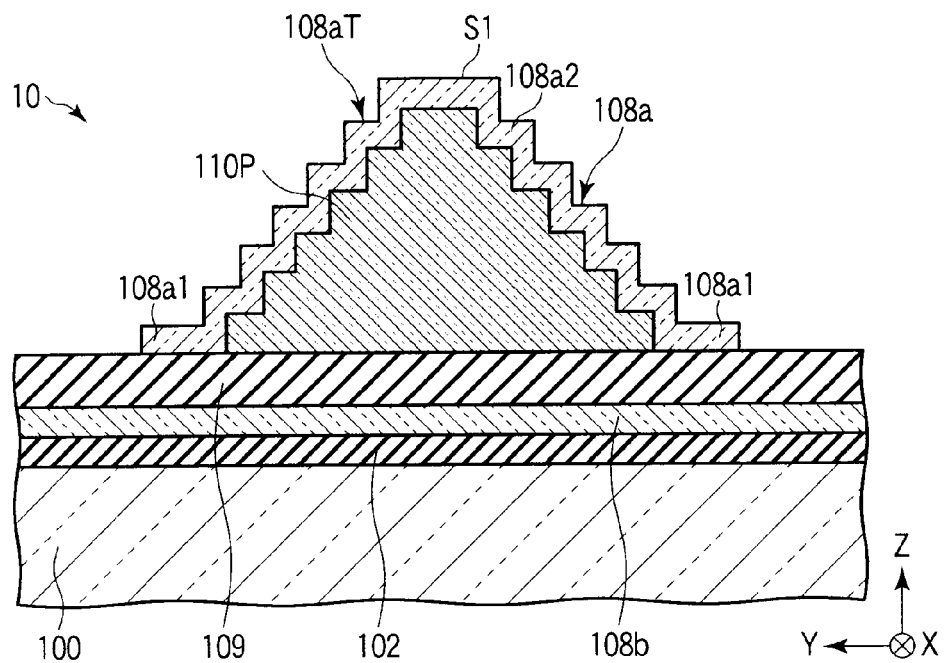
F I G. 10
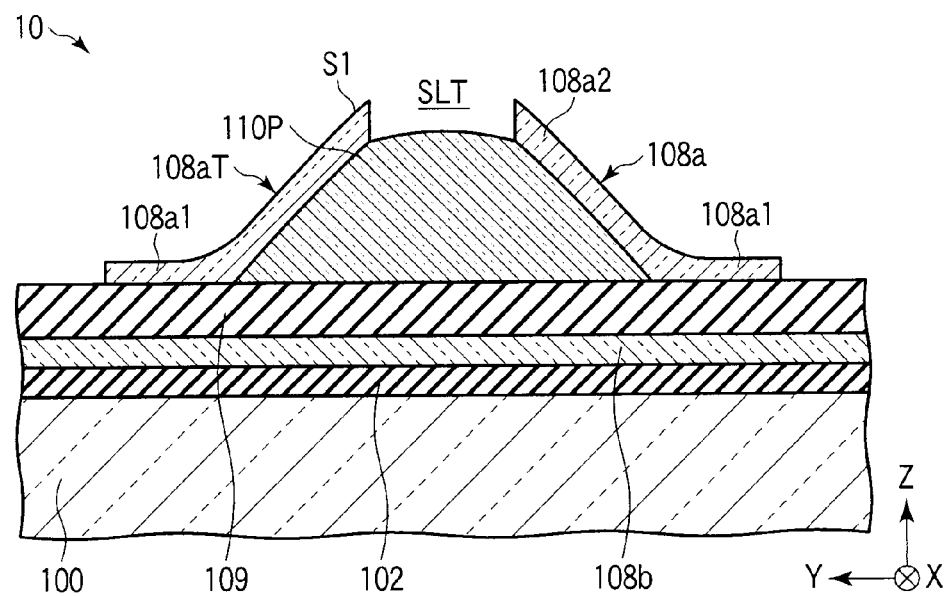
F I G. 11

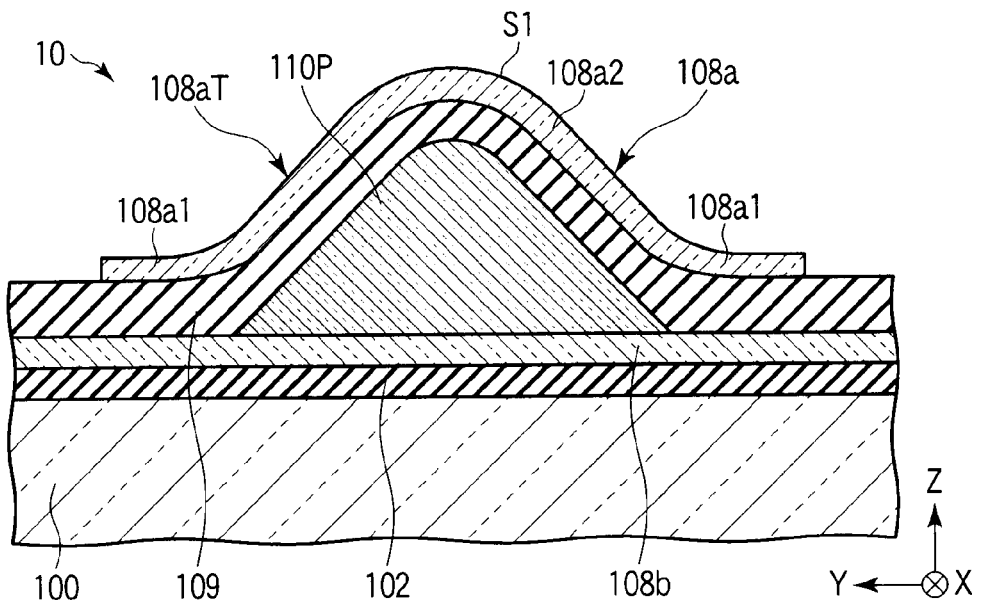
F I G. 12
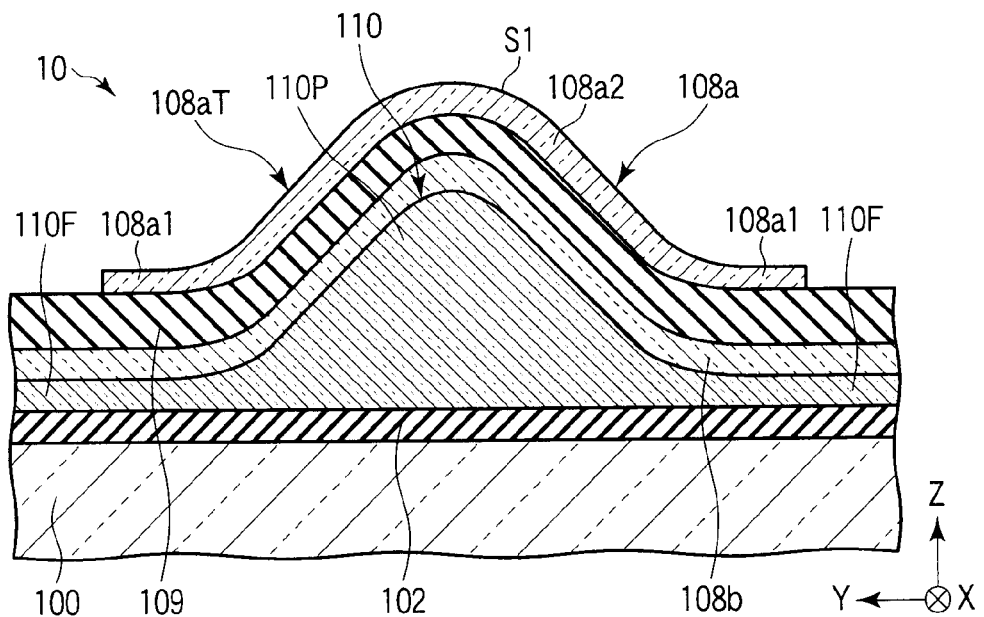
F I G. 13

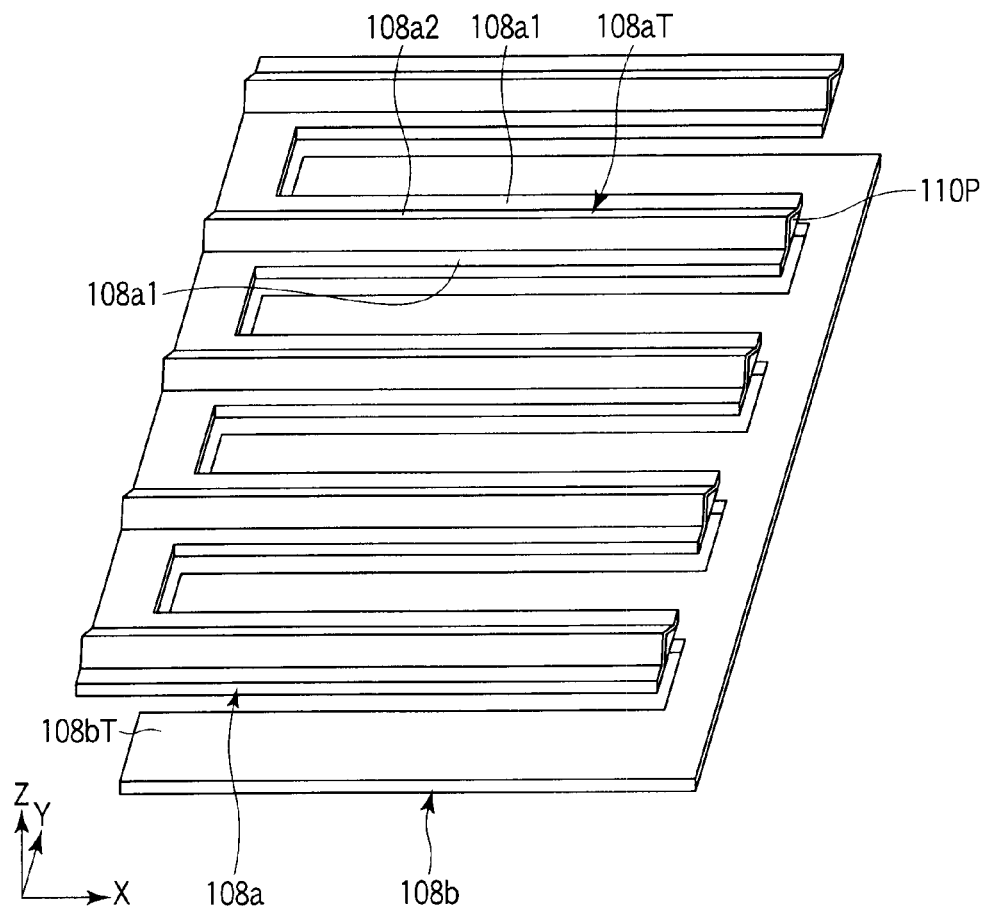
F I G. 16

LIQUID CRYSTAL DISPLAY EXHIBITING KERR EFFECT COMPRISING ELECTRODES HAVING COMBTOOTH PORTIONS THAT INCLUDE A FIRST CONVEX SURFACE WITH A RIDGE SHAPE

CROSS-REFERENCE TO RELATED APPLICATIONS

This application is a Continuation Application of PCT Application No. PCT/JP2010/054865, filed Mar. 19, 2010 and based upon and claiming the benefit of priority from prior Japanese Patent Application No. 2009-073904, filed Mar. 25, 2009, the entire contents of all of which are incorporated herein by reference.

FIELD

Embodiments described herein relate generally to a liquid crystal display.

BACKGROUND

The Kerr effect is a non-linear optical effect of an isotropic transparent medium that a refractive index thereof changes in proportional to the square of the applied external electric field. A liquid crystal material that exhibits the Kerr effect shows a high-speed electric-field response of several milliseconds or less because the correlation length of the liquid crystal molecules is short. Cholesteric blue phase, smectic blue phase and pseudo-isotropic phase are known as liquid crystal phases that exhibit the Kerr effect.

In a liquid crystal display utilizing the Kerr effect, for example, a common electrode and pixel electrodes are arranged above a substrate. The common electrode is, for example, a continuous film. The pixel electrodes are, for example, combteeth-shaped conductive patterns that face the common electrode with an insulating layer interposed therebetween.

When a voltage is applied between the pixel electrodes and the common electrode, a transverse electric field is generated in the liquid crystal layer to have lines of electric force that are almost perpendicular to both the normal to the substrate and the lengthwise direction of the combtooth portions of the electrode. The transmittance of each pixel changes in response to the intensity of the transverse electric field.

BRIEF DESCRIPTION OF THE DRAWINGS

FIG. 4 is an another sectional view of the liquid crystal display panel shown in FIG. 3;

FIG. 5 is a perspective view schematically showing one of the substrates of the liquid crystal display panel shown in FIGS. 3 and 4;

FIG. 10 is a sectional view schematically showing another example of a structure that can be employed in the electrode;

FIG. 11 is a sectional view schematically showing still another example of a structure that can be employed in the electrode;

FIG. 12 is a sectional view schematically showing an example of a structure that can be employed in a protruding portion;

FIG. 13 is a sectional view schematically showing another example of a structure that can be employed in the protruding portion;

FIG. 16 is a perspective view schematically showing an electrode included in the liquid crystal display panel shown in FIG. 15.

DETAILED DESCRIPTION

Figure 1:
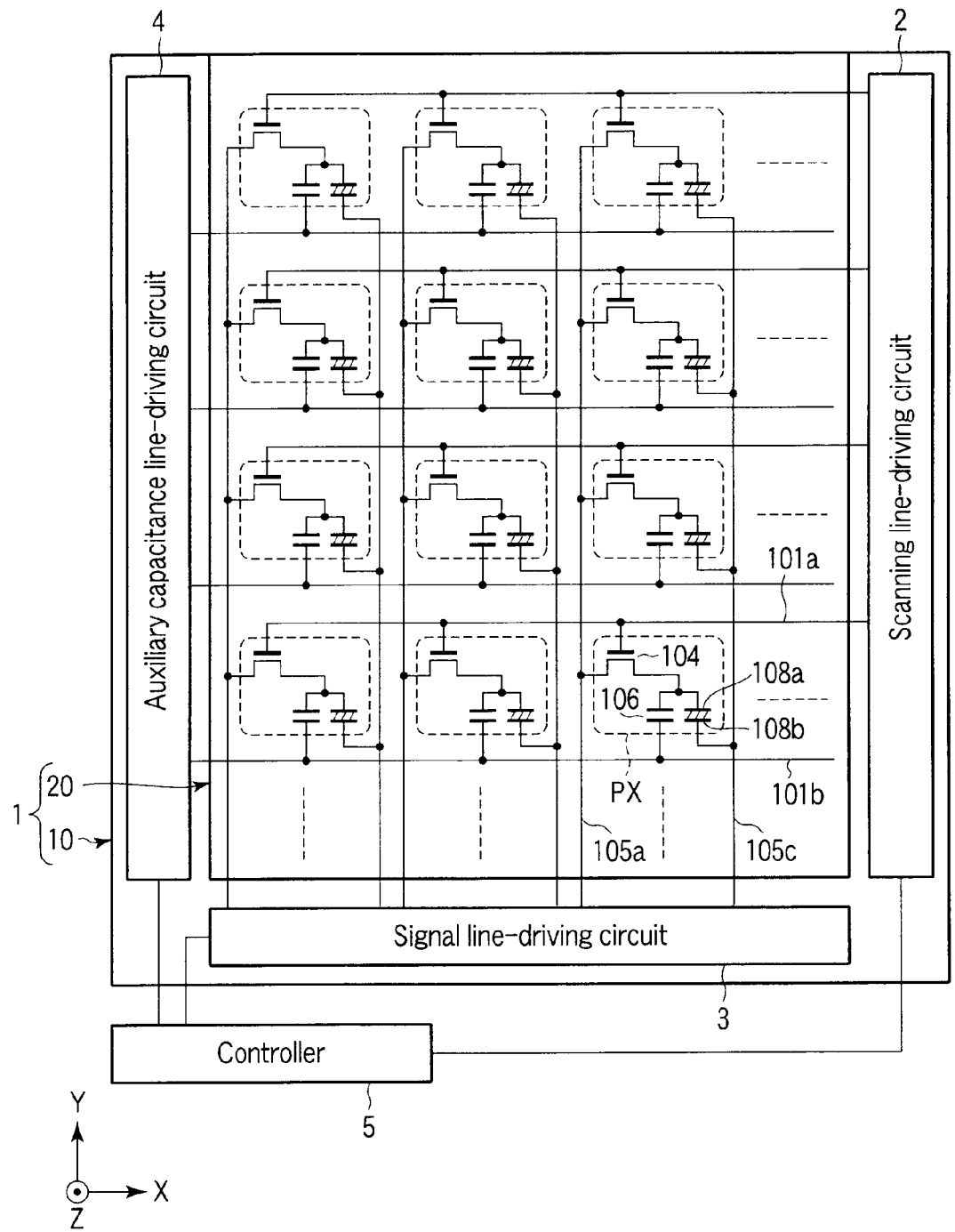
FIG. 1 is a plan view schematically showing a liquid crystal display according to a first embodiment.

In general, according to one embodiment, a liquid crystal display comprises a liquid crystal layer exhibiting Kerr effect; a first electrode including combtooth portions facing one main surface of the liquid crystal layer, the combtooth portions each extending in a first direction and arranged in a second direction, the first and second directions being parallel with the main surface and crossing each other; a second electrode electrically insulated from the first electrode, the second electrode including a portion that faces the main surface and is positioned in a gap between the combtooth portions or faces the main surface with the gap interposed therebetween; and first protruding portions facing the main surface with at least one of the first and second electrodes interposed therebetween, the first protruding portions each extending in the first direction and arranged in the second direction, and each of the first protruding portions forming a first convex surface having a ridge shape on a surface of the combtooth portion or a surface of the portion of the second electrode positioned at the gap.

According to another embodiment, a liquid crystal display comprises a liquid crystal layer exhibiting Kerr effect; a first electrode including combtooth portions facing one main surface of the liquid crystal layer, the combtooth portions each extending in a first direction and arranged in a second direction, the first and second directions being parallel with the main surface and crossing each other, each of the combtooth portions including a pair of first portions each extending in the first direction and arranged in the second direction, each of the first portions having a surface parallel with the first and second directions, and a second portion extending in the first direction between the first portions and having a surface including a first convex surface, the first convex surface having a ridge shape and extending in the first direction; and a second electrode electrically insulated from the first electrode, the second electrode including a portion that faces the main surface and is positioned in a gap between the combtooth portions or faces the main surface with the gap interposed therebetween.

According to still another embodiment, a liquid crystal display comprises a liquid crystal layer exhibiting Kerr effect; a first electrode including combtooth portions facing one main surface of the liquid crystal layer, the combtooth portions each extending in a first direction and arranged in a second direction, the first and second directions being parallel with the main surface and crossing each other; an insulating layer facing the main surface with the first electrode interposed therebetween; and a second electrode electrically insulated from the first electrode, the second electrode including a portion that faces the main surface with the insulating layer interposed therebetween and another portion protruding toward the liquid crystal layer at a position corresponding to a gap between the combtooth portions.

Various embodiments will be described below with reference to the accompanying drawings. Note that the same reference characters in the drawings denote components that achieve the same or similar functions, and a repetitive explanation thereof will be omitted.

The structure of the liquid crystal display according to the first embodiment will be described with reference to FIGS. 1 to 6. Note that some components are omitted in FIGS. 2 and 5 for the sake of simplification.

The liquid crystal display shown in FIG. 1 is a liquid crystal display employing an active-matrix driving method. The liquid crystal display includes a liquid crystal display panel 1, a backlight unit (not shown) facing the liquid crystal display panel 1, a scanning line-driving circuit 2, a signal line-driving circuit 3, an auxiliary capacitance line-driving circuit 4, and a controller 5 electrically connected to the driving circuits 2 to 4.

The liquid crystal display panel 1 includes an array substrate 10 and a counter substrate 20. A frame-shaped sealing layer (not shown) is interposed between the array substrate 10 and the counter substrate 20. The space surrounded by the array substrate 10, the counter substrate 20 and the sealing layer is filled with a liquid crystal material. The liquid crystal material forms a liquid crystal layer 30. On the outer face of the array substrate 10, a linear polarizer 50R is placed. On the outer face of the counter substrate 20, a linear polarizer 50F is placed.

The array substrate 10 includes a light-transmitting substrate 100. The substrate 100 is, for example, a glass substrate or a plastic substrate.

On the substrate 100, scanning lines 101a and auxiliary capacitance lines 101b are arranged. The scanning lines 101a and the auxiliary capacitance lines 101b extend in an X direction and are alternately arranged in a Y direction crossing the X direction.

Note that the X and Y directions are parallel with one of the main surfaces of the substrate 100 and cross each other. Note also that a Z direction, which will be described later, is perpendicular to the X and Y directions.

Each of the scanning line 101a includes extension portions extending in the Y direction. The extension portions are used as gate electrodes of thin-film transistors, which will be described later.

Each of the auxiliary capacitance lines 101b includes extension portions extending in the Y direction. The extension portions are used as electrodes of capacitors, which will be described later.

The scanning lines 101a and the auxiliary capacitance lines 101b can be formed in the same step. As the material of the scanning lines 101a and the auxiliary capacitance lines 101b, for example, metal or alloy can be used.

The scanning lines 101a and the auxiliary capacitance lines 101b are covered with an insulating layer 102. As the insulating layer 102, for example, silicon oxide layer can be used.

On the insulating layer 102, semiconductor layers 103 are arranged correspondingly with the above-described gate electrodes. The semiconductor layer 103 are arranged to intersect the gate electrodes. The semiconductor layers 103 are made of, for example, amorphous silicon or polysilicon.

The gate electrodes, the semiconductor layer 103 and the portions of the insulating layer 102 sandwiched between the gate electrodes and the semiconductor layers 103 form thin-film transistors. The thin-film transistors are used as switches 104.

Note that in the present embodiment, the switches 104 are n-channel thin-film transistors. Note also that on each semiconductor layer 103, a channel protection layer and an ohmic layer are formed (not shown) in this order.

The switches may be p-channel thin-film transistors. Alternatively, the switches 104 may be other switching elements such as diodes.

On the insulating layer 102, signal lines 105a, source electrodes 105b and power supply lines 105c are further arranged.

The signal lines 105a extend in the Y direction and are arranged in the X direction correspondingly with the columns that the switches 104 form. The signal line 105a cover the drains of the semiconductor layers 103 included in the switches 104. That is, portions of the signal lines 105a are drain electrodes electrically connected to the switches 104.

The source electrodes 105b are arranged correspondingly with the switches 104. The source electrodes 105b cover the sources of the switches 104 and face the auxiliary capacitance lines 101b. The source electrodes 105b, the auxiliary capacitance lines 105b and portions of the insulating layer 102 sandwiched therebetween form capacitors 106.

The power supply lines 105c extend in the Y direction and are arranged in the X direction. The power supply lines 105c may extend in the X direction and be arranged in the Y direction.

Figure 2:
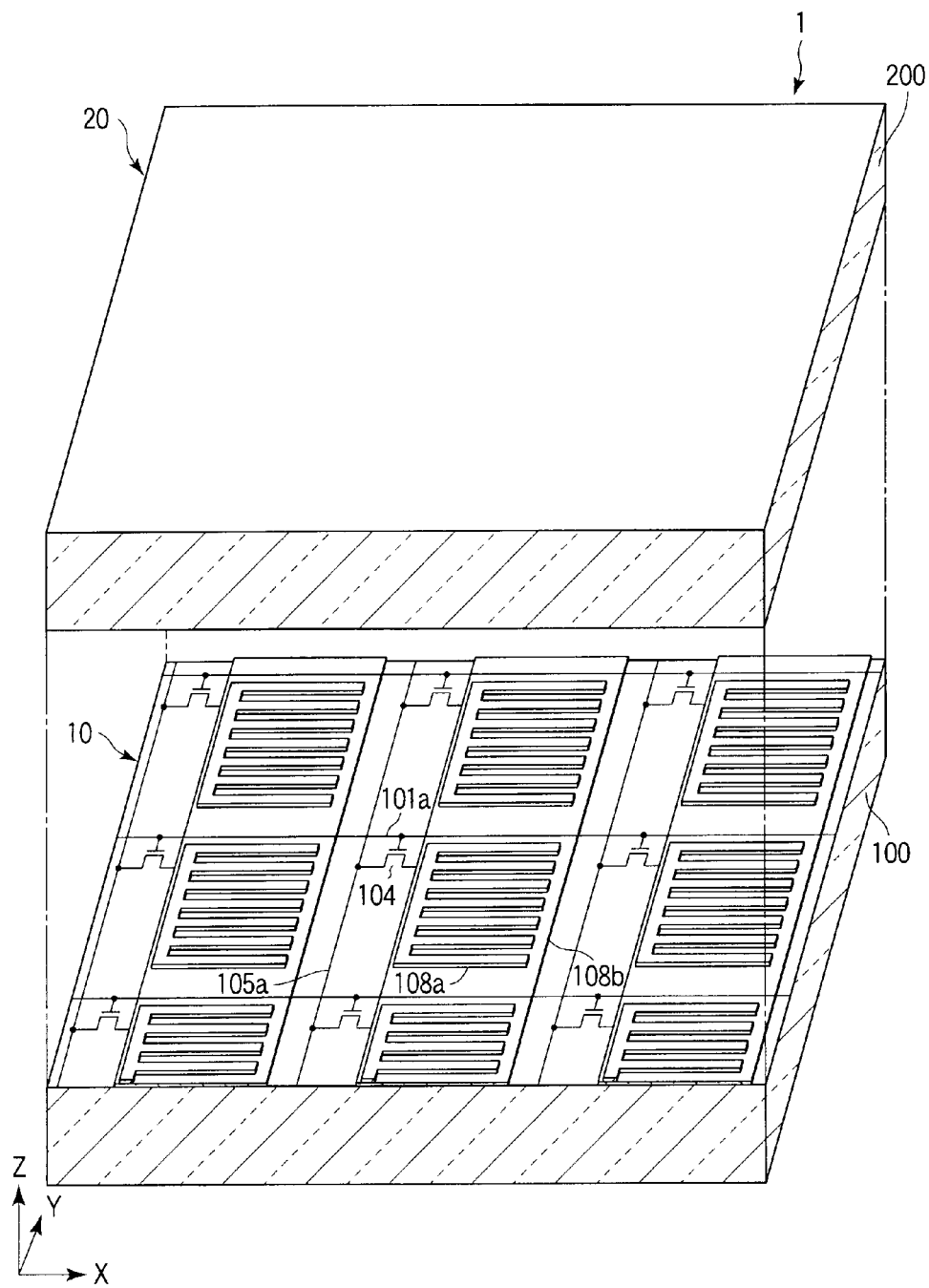
FIG. 2 is an exploded perspective view of a liquid crystal display panel included in the liquid crystal display shown in FIG. 1.
Figure 3:
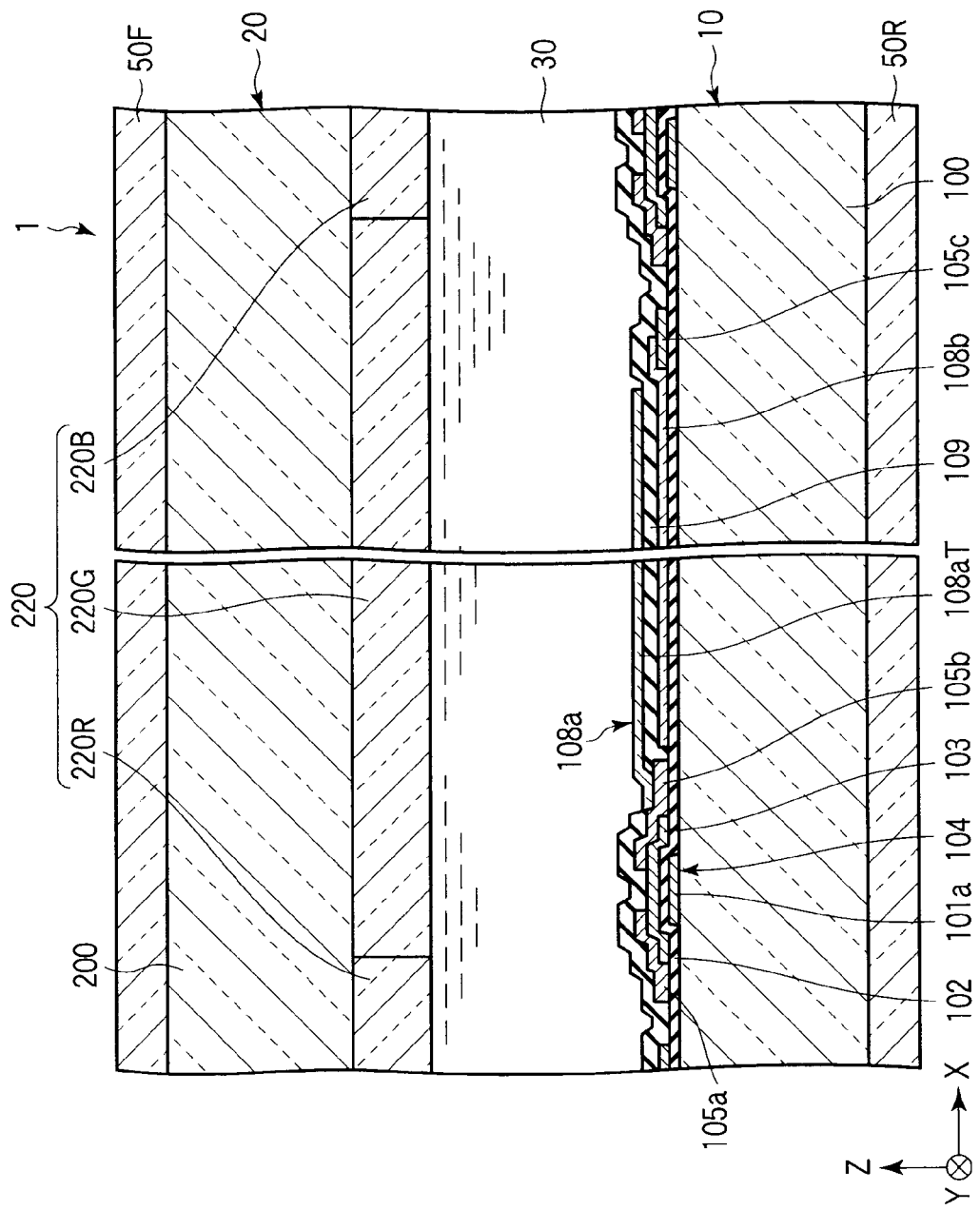
FIG. 3 is a sectional view schematically showing an example of a structure that can be employed in the liquid crystal display panel of the liquid crystal display shown in FIG. 1.
Figure 6:
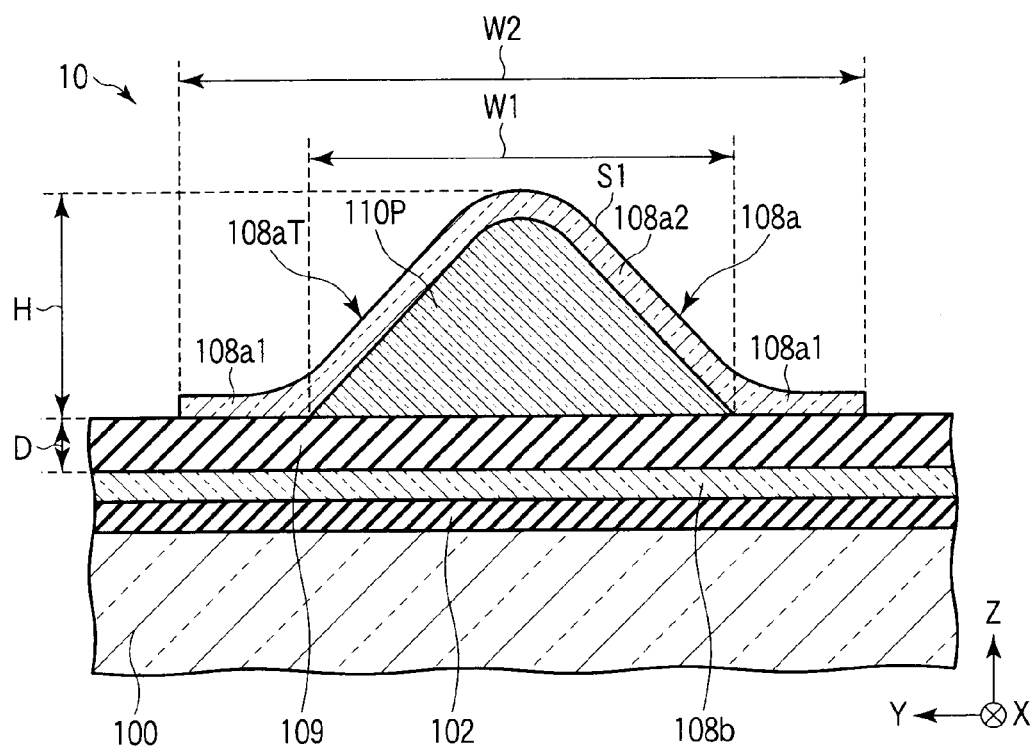
FIG. 6 is a sectional view showing an electrode included in the substrate shown in FIG. 5.

On the insulating layer 102, counter electrodes 108b are further arranged correspondingly with the switches 104. Each of the counter electrodes 108b at least partially covers one of the power supply lines 105c and includes a comb-shaped portion having combteeth extending in the X direction. As a material of the counter electrodes 108b, for example, indium tin oxide (hereinafter referred to as ITO) can be used. In the case where the counter electrodes 108b adjacent in the Y direction are electrically connected to one another as shown in FIG. 2 or the case where the counter electrodes adjacent in the X direction are electrically connected to one another, the power supply lines 105c can be omitted.

The counter electrodes 108b are covered with an insulating layer 109. The insulating layer 109 is, for example, a transparent inorganic layer such as silicon oxide layer, silicon nitride layer, or a multilayer including them. A transparent organic layer may be used as the insulating layer 109.

On the insulating layer 109, protruding patterns are arranged correspondingly with the counter electrodes 108b. Each of the protruding patterns faces one of the counter electrodes 108b.

Each protruding pattern includes protruding portions 110P. The protruding portions 110P extend in a first direction that is parallel with the main surface of the substrate and are arranged in a second direction that is parallel with the main surface and crosses the first direction. Here, as an example, it is supposed that the protruding portions 110P extend in the X direction and are arranged in the Y direction.

In each protruding pattern, the protruding portions 110P may be arranged at a regular interval or irregular intervals. Here, as an example, it is supposed that the protruding portions 110P are arranged at a regular interval.

Typically, a cross section of each protruding portion 110P that is perpendicular to the lengthwise direction thereof tapers down toward the liquid crystal layer 30. Here, as an example, it is supposed that each protruding portion 110P is a triangular pole with one of the lateral faces parallel with the main surface of the substrate 100.

Although the protruding portions 110P may not have light-transmitting property, the protruding portions 110P typically have a light-transmitting property. The protruding portions 110P may be transparent or opaque. The protruding portions 110P may be colorless or colored. Here, as an example, it is supposed that the protruding portions 110P are colorless and transparent.

The protruding portions 110P may have electric conductivity or not. In the case where resin is used as the material of the protruding portions 110P, the protruding portions 110P typically are electrically insulating.

The size of the protruding portion 110P in the direction perpendicular to both its lengthwise direction and the Z direction, that is, the width of the protruding portion 110P is set within, for example, a range of 0.5 μm to one-third of the pixel pitch. The size of the protruding portion 110P in the Z direction, that is, the height of the protruding portion 110P is set within, for example, a range of 0.1 μm to the cell gap. The ratio of the height to the width is set within, for example, a range of 0.1 to 10.

On the protruding patterns, pixel electrodes 108a are formed. The pixel electrodes 108a are arranged correspondingly with the switches 104. The pixel electrodes 108a are electrically insulated from the counter electrodes 108b and at least partially cover the source electrodes 105b. That is, the pixel electrodes 108a are electrically connected to the sources of the switches 104. As the material of the pixel electrodes 108a, for example, ITO can be used.

Each pixel electrode 108a includes combtooth portions 108aT extending in the first direction and arranged in the second direction. In each pixel electrode 108a, the combtooth portions 108aT are electrically connected to each other and form a space therebetween. Here, the combtooth portions 108aT extend in the X direction and are arranged in the Y direction.

The combtooth portions 108aT cover the protruding portions 110P. The protruding portions 110P form convex surfaces Si corresponding to the protruding portions 110P on the surfaces of the combtooth portions 108aT. In other words, the protruding portions 110P form on the surfaces of the combtooth portions 108aT the convex surfaces S1 each having a shape corresponding to the shape of the surface of the protruding portion 110P.

Each of the combtooth portions 108aT includes a pair of first portions 108a1 arranged in the second direction and a second portion 108a2 interposed between the first portions 108a1.

The first portions 108a1 are edges of the combtooth portion 108aT along the lengthwise direction. The first portions 108a1 are in contact with the insulating layer 109. Each of the first portions 108a1 has a main surface parallel with the first and second directions. In the case where the term "parallel" is used in describing the main surface of the combtooth portion, the angle that the main surface of the combtooth portion forms with the main surface of the liquid crystal layer or the substrate falls within a range of 0° to 10°. The first portions 108a1 can be omitted.

The second portions 108a2 cover the protruding portions 110P. The surface of each second portion 108a2 includes the above-described convex surface S1. Each second portion 108a2 is electrically connected to the first portions 108a1 sandwiching this second portion 108a2. In each pixel electrode 108a, the combtooth portions 108aT form a gap between them. The counter electrode 108b includes a portion that is positioned in the gap and faces the liquid crystal layer 30 or a portion that faces the liquid crystal layer 30 with the gap interposed therebetween.

Note that the switches 104, the capacitors 106, the pixel electrodes 108a and the counter electrodes 108b form pixel circuits. The capacitors 106 may be omitted from the pixel circuits.

The counter substrate 20 includes a light-transmitting substrate 200. The substrate is, for example, a glass substrate or a plastic substrate.

On the substrate 200, a black matrix (not shown) and a color filter 220 are formed in this order.

The black matrix is a light-shielding layer having openings at positions corresponding to the pixel electrodes 108a and the counter electrodes 108b. The black matrix is, for example, a patterned layer having a grid or stripe shape. As the material of the black matrix, for example, metal or alloy such as chromium can be used.

The color filter 220 includes a red-coloring layer 220R, a green-coloring layer 220G and a blue-coloring layer 220B. The coloring layers, 220R, 220G and 220B form a stripe arrangement corresponding to the columns that the pixel circuits form. The coloring layers, 220R, 220G and 220B may form another arrangement such as a delta arrangement or square arrangement.

The array substrate 10 and the counter substrate 20 are arranged such that the pixel circuits and the color filter 220 face each other. The frame-shaped sealing layer (not shown) is sandwiched between the array substrate 10 and the counter substrate 20. The sealing layer bonds the array substrate 10 and the counter substrate 20 together. As the material of the sealing layer, adhesive can be used.

Granular spacers are interposed between the array substrate 10 and the counter substrate 20. Alternatively, the array substrate 10 and/or the counter substrate 20 may further include columnar spacers. The spacers form a gap having almost uniform thickness at positions of the pixel electrodes 108a between the array substrate 10 and the counter substrate 20.

The space surrounded by the array substrate 10, the counter substrate 20 and the sealing layer is filled with a liquid crystal material. The liquid crystal material forms the liquid crystal layer 30.

The liquid crystal layer 30 exhibits the Kerr effect. That is, the liquid crystal material is in a phase that exhibits Kerr effect such as cholesteric blue phase, smectic blue phase or pseudo-isotropic phase. In the case where the liquid crystal material is in the cholesteric blue phase, the liquid crystal layer 30 exhibits the selective reflection in addition to the Kerr effect.

The liquid crystal material in the cholesteric blue phase is typically a mixture of a liquid crystal compound and a chiral agent. The mixture may further contain other substances. For example, in the case where a liquid crystal compound, specifically a high-molecular weight compound, which has a molecular weight much higher than that of a low-molecular weight liquid crystal material, is added to the mixture, the temperature range within which the liquid crystal material is in the blue phase can be broaden.

Here, as an example, it is supposed that the liquid crystal layer 30 behaves similar to an optically isotropic layer when no voltage is applied, that is, when a black image is displayed. Further, for the sake of simplification, it is supposed that the liquid crystal layer 30 serves as a half-wave plate for all the wavelengths in the visible range when a white image is displayed.

The Kerr constant of the liquid crystal material falls within, for example, a range of $1\times10^{-11}$ mV$^{-2}$ to $1\times10^{-8}$ mV$^{-2}$. In the case where the Kerr constant of the liquid crystal material is small, achievement of a high constant ratio is difficult.

In this liquid crystal display panel 1, each pixel PX includes the above-described pixel circuit and the portion of the liquid crystal layer 30 that faces the electrode 108a or 108b of this pixel circuit. The substrates 10 and 20 and the liquid crystal layer 30 and the sealing layer interposed between the substrates 10 and 20 form a liquid crystal cell.

The linear polarizer 50R is, for example, an absorption-type linear polarizer. Here, as an example, it is supposed that the transmission axis of the linear polarizer 50R is inclined in a clockwise direction at an angle of 45° with respect to the Y direction when the liquid crystal display panel 1 is viewed from the back.

The linear polarizer 50F is, for example, an absorption-type linear polarizer. Here, as an example, it is supposed that the transmission axis of the linear polarizer 50F is perpendicular to the transmission axis of the linear polarizer 50R.

The scanning line-driving circuit 2 is electrically connected to the scanning lines 101a. The scanning line-driving circuit 2 sequentially supplies the scanning lines 101a with a first scan voltage that makes the switches 104 close. Further, the scanning line-driving circuit 2 supplies a second scan voltage that makes the switches 104 open to the scanning lines 101a to which the first scan voltage is not supplied.

The signal line-driving circuit 3 is electrically connected to the signal lines 105a and the power supply lines 105c. The signal line-driving circuit 3 supplies each signal line 105a with a signal voltage that has a magnitude corresponding to a video signal. Further, the signal line-driving circuit 3 supplies each power supply line 105c with a display voltage that is typically a constant voltage. Although employed is the structure in which the signal line-driving circuit 3 includes the voltage source for supplying the power supply lines 105c with the display voltage, the voltage source for supplying the power supply lines 105c with the display voltage may be provided outside the signal line-driving circuit 3.

The auxiliary capacitance line-driving circuit 4 is electrically connected to the auxiliary capacitance lines 101b. In the case where the signal line-driving circuit 3 reverses the polarity of the signal voltage supplied to the signal line 105a from the positive polarity to the negative polarity, the auxiliary capacitance line-driving circuit 4 changes the electric potential of the auxiliary capacitance line 101b to which the pixels to be supplied with the above signal voltage are electrically connected from a first electric potential to a second electric potential in synchronization with the polarity reversal. In the case where the signal line-driving circuit 3 reverses the polarity of the signal voltage supplied to the signal line 105a from the negative polarity to the positive polarity, the auxiliary capacitance line-driving circuit 4 changes the electric potential of the auxiliary capacitance line 101b to which the pixels to be supplied with the above signal voltage are electrically connected from the second electric potential to the first electric potential in synchronization with the polarity reversal.

Note that "the polarity of the signal voltage" means the polarity of the difference between the signal voltage and the display voltage.

The driving circuits can be mounted to the liquid crystal display panel 1 using the chip-on-glass (COG) technology. Alternatively, the driving circuits may be mounted to the liquid crystal display panel 1 using the tape carrier package (TCP) technology.

The controller 5 is electrically connected to the driving circuits 2 to 4. The controller 5 controls the operation of the driving circuits 2 to 4.

The backlight unit (not shown) illuminates the liquid crystal display panel 1 from the side of array substrate 10. Typically, the backlight unit emits a white light.

Although the term "liquid crystal display" is used here as an assembly including the liquid crystal display panel 1, the driving circuits 2 to 4, the controller 5 and the backlight unit, it is stated that the term "liquid crystal display" also encompasses the assemblies from which one or more of the linear polarizer 50R and 50F, driving circuits 2 to 4, controller 5 and backlight unit is omitted.

As described above, the liquid crystal display utilizes the Kerr effect. Thus, the liquid crystal display achieves a high response speed. In addition, the liquid crystal display employs the above-described structure in the pixel electrodes 108a. When such a structure is employed, a high contrast ratio can be achieved as will be described below.

When a voltage is applied between the electrodes 108a and 108b, an electric field is generated in the liquid crystal layer 30. In the case where the entire surface of the combtooth portion 108aT is a flat surface perpendicular to the Z direction, the electrical flux lines drawn from the edges of the combtooth portion 108aT directly reach the portions of the counter electrode 108b that are almost directly below the edges. On the other hand, the electrical flux lines drawn from the center of the combtooth portion 108aT largely circumvent the edges of the combtooth portion 108aT to reach the counter electrode 108b. For this reason, the difference between the intensity of the electric field in the region near the edges of the combtooth portion 108aT and the intensity of the electric field in other regions is large. Thus, the retardation for the portions of the liquid crystal layer 30 that correspond to the edges of the combtooth portion 108aT largely differs from the retardation for the other portions of the liquid crystal layer 30. Therefore, in the case where the entire surface of the combtooth portion 108aT is perpendicular to the Z direction, the optimum retardation can be achieved only in a very small portion of the liquid crystal layer 30.

In the case where the surface of the combtooth portion 108aT includes the convex surface S1, the electrical flux lines drawn from the center of the combtooth portion 108aT reach the counter electrode 108b without a large circumvention. Thus, the difference between the intensity of the electric field in the region near the edges of the combtooth portion 108aT and the intensity of the electric field in other regions is small. Therefore, in this case, the region in which a transverse electric field having almost uniform intensity, which is an electric field whose electrical flux lines are perpendicular to both the Z direction and the lengthwise direction of the combtooth portion 108aT, that is, an electric field whose lines of force are parallel with the Y direction here, is larger in the Y direction as compared with the case where the entire surface of the combtooth portion 108aT is flat. Further, in this case, since the center of the combtooth portion 108aT is higher than the edges of the combtooth portion 108aT, the region in which a transverse electric field having almost uniform intensity is lager in the Z direction as compared with the case where the entire surface of the combtooth portion 108aT is flat. That is, in the case of employing the structure in which the surface of the combtooth portion 108aT includes the convex surface S1, the region in which a transverse electric field having almost uniform intensity is extended as compared with the case of employing the structure in which the entire surface of the combtooth portion 108aT is flat. In other words, in the case where the surface of the combtooth portion 108aT includes the convex surface S1, the optimum retardation can be achieved in a larger region of the liquid crystal layer 30 as compared with the case where the entire surface of the combtooth portion 108aT is flat. Therefore, when the above structure is employed, a high contrast ratio can be achieved.

In this liquid crystal display, the first portions 108a1 may be omitted from the combtooth portion 108aT as described above. In the case where the combtooth portion 108aT includes the first portions 108a1, however, a higher contrast ratio can be achieved as compared with the case where the first portions 108a1 are omitted from the combtooth portion 108aT. In particular, in the case of employing the structure described below, a superexcellent display performance can be achieved.

Figure 7:
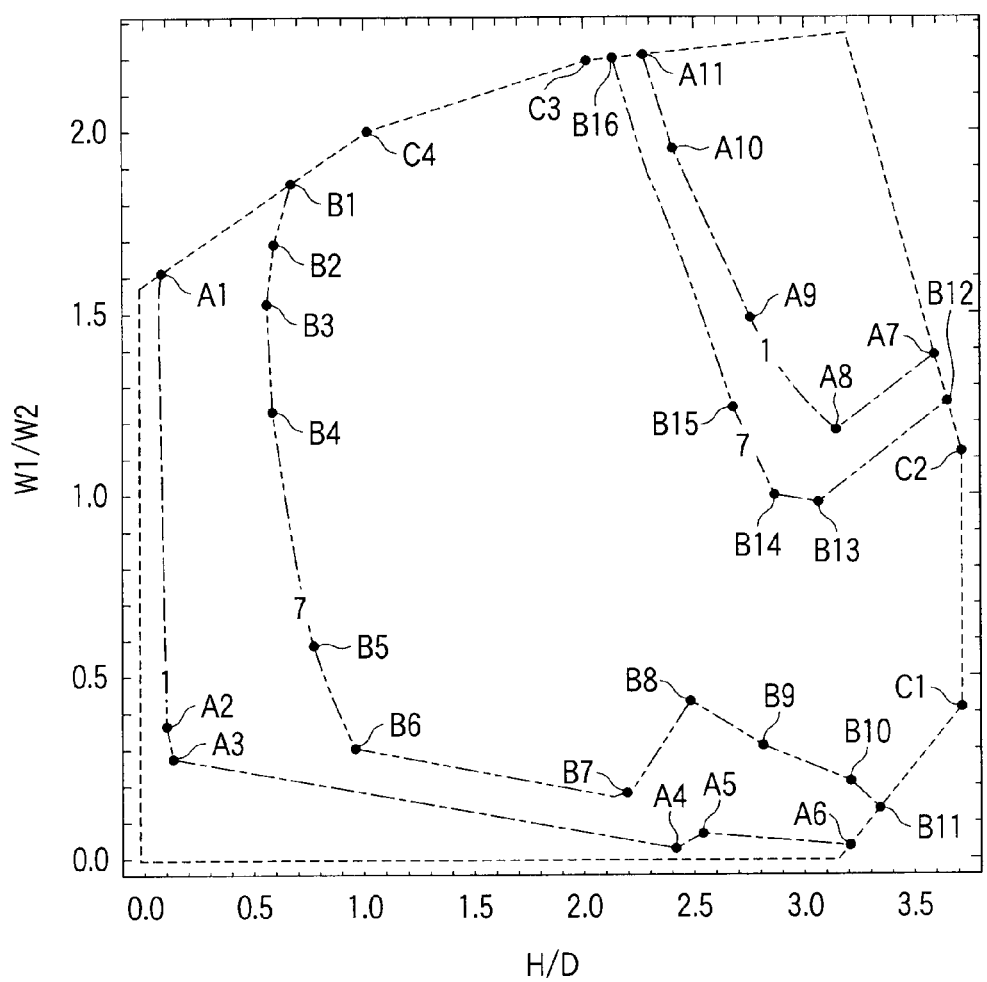
FIG. 7 is a diagram showing an example of a relationship between a structure of the electrode and an average luminance obtained from a computer simulation.

FIG. 7 shows the result of a computer simulation performed on the liquid crystal display described with reference to FIGS. 1 to 6. In the computer simulation, the rate of increase in luminance was calculated using ratios H/D ad W1/W2 as parameters. Here, the ratio H/D is a ratio of the height H of the second portion 108a2 with respect to the thickness D of the insulating layer 109. The ratio W1/W2 is a ratio of the width W1 of the second portion 108a2 with respect to the width W2 of the combtooth portion 108aT. The rate of increase in luminance is a value calculated using the formula: (L1−L0)/L0. Here, "L0" is the luminance when a constant voltage is applied between the electrodes 108a and 108b in the case where the entire surface of the combtooth portion 108aT is flat. On the other hand, "L1" is the luminance when the same voltage as above is applied between the electrodes 108a and 108b in the case where the combtooth portion 108aT includes the first portions 108a1.

Note that physical properties of the materials constituting the layers may have influence on the result of the calculation. Their influence on the result of the calculation, however, is sufficiently small to be ignored as compared with the influence of the ratios H/D and W1/W2 on the result of the calculation. Here, the calculation was performed supposing that the liquid crystal material forming the liquid crystal layer 30 had dielectric constants of about 18 and about 7 in the direction along the electrical flux lines and the direction perpendicular thereto, respectively; the insulating layer 109 had a dielectric constant of about 7; the liquid crystal layer 30 had a thickness of 5 μm; and each combtooth portion 108aT had a width W2 of 3 μm.

In FIG. 7, the region surrounded by the broken line indicates the range in which the calculation was performed. The region sandwiched between a pair of alternate long and short dashed lines indicates the range in which the rate of luminance increase is 1% or more. The region sandwiched between a pair of chain double-dashed lines indicates the range in which the rate of luminance increase is 7% or more.

As shown in FIG. 7, in the case where the ratios H/D and W1/W2 are plotted on horizontal and vertical axes of Cartesian coordinate system, respectively, when a point (H/D, W1/W2) is positioned in a region surrounded by a line segment connecting points A1 (0.10, 1.61) and A2 (0.12, 0.34), a line segment connecting the point A2 (0.12, 0.34) and a point A3 (0.18, 0.27), a line segment connecting the point A3 (0.18, 0.27) and a point A4 (2.40, 0.03), a line segment connecting the point A4 (2.40, 0.03) and a point A5 (2.55, 0.06), a line segment connecting the point A5 (2.55, 0.06) and a point A6 (3.22, 0.03), a line segment connecting the point A6 (3.20, 0.03) and a point C1 (3.70, 0.40), a line segment connecting the point C1 (3.70, 0.40) and a point C2 (3.70, 1.13), a line segment connecting the point C2 (3.70, 1.13) and a point A7 (3.60, 1.38), a line segment connecting the point A7 (3.60, 1.38) and a point A8 (3.15, 1.17), a line segment connecting the point A8 (3.15, 1.17) and a point A9 (2.80, 1.41), a line segment connecting the point A9 (2.80, 1.41) and a point A10 (2.41, 1.95), a line segment connecting the point A10 (2.41, 1.95) and a point A11 (2.26, 2.21), a line segment connecting the point A11 (2.26, 2.21) and a point C3 (2.00, 2.20), a line segment connecting the point C3 (2.00, 2.20) and a point C4 (1.03, 2.03), and a line segment connecting the points C4 (1.03, 2.03) and A1 (0.10, 1.61), a rate of luminance increase of 1% or more can be achieved.

For example, in the case where the ratio H/D falls within a range of 0.15 to 2.65 and the ratio W1/W2 falls within a range of 0.26 to 1.61, the case where the ratio H/D falls within a range of 1.00 to 2.30 and the ratio W1/W2 falls within a range of 0.17 to 2.00, or the case where the ratio H/D falls within a range of 2.65 to 3.15 and the ratio W1/W2 falls within a range of 0.40 to 1.17, a rate of luminance increase of 1% or more can be achieved.

In the case where the ratios H/D and W1/W2 are plotted on horizontal and vertical axes of Cartesian coordinate system, respectively, when a point (H/D, W1/W2) is positioned in a region surrounded by a line segment connecting points B1 (0.68, 1.84) and B2 (0.61, 1.68), a line segment connecting the point B2 (0.61, 1.68) and a point B3 (0.59, 1.54), a line segment connecting the point B3 (0.59, 1.54) and a point B4 (0.60, 1.23), a line segment connecting the point B4 (0.60, 1.23) and a point B5 (0.78, 0.59), a line segment connecting the point B5 (0.78, 0.59) and a point B6 (0.96, 0.30), a line segment connecting the point B6 (0.96, 0.30) and a point B7 (2.18, 0.17), a line segment connecting the point B7 (2.18, 0.17) and a point B8 (2.50, 0.42), a line segment connecting the point B8 (2.50, 0.42) and a point B9 (2.83, 0.30), a line segment connecting the point B9 (2.83, 0.30) and a point B10 (3.19, 0.21), a line segment connecting the point B10 (3.19, 0.21) and a point B11 (0.34, 0.13), a line segment connecting the point B11 (0.34, 0.13) and a point C1 (3.70, 0.40), a line segment connecting the point C1 (3.70, 0.40) and a point C2 (3.70, 1.13), a line segment connecting the point C2 (3.70, 1.13) and a point B12 (3.65, 1.24), a line segment connecting the point B12 (3.65, 1.24) and a point B13 (3.07, 0.96), a line segment connecting the point B13 (3.07, 0.96) and a point B14 (2.86, 0.98), a line segment connecting the point B14 (2.86, 0.98) and a point B15 (2.67, 1.23), a line segment connecting the point B15 (2.67, 1.23) and a point B16 (2.10, 2.20), a line segment connecting the point B16 (2.10, 2.20) and a point C3 (2.00, 2.20), a line segment connecting the point C3 (2.00, 2.20) and a point C4 (1.03, 2.03), and a line segment connecting the points C4 (1.03, 2.03) and B1 (0.68, 1.84), a rate of luminance increase of 7% or more can be achieved.

For example, in the case where the ratio H/D falls within a range of 0.70 to 2.32 and the ratio W1/W2 falls within a range of 0.90 to 1.84, the case where the ratio H/D falls within a range of 0.96 to 2.23 and the ratio W1/W2 falls within a range of 0.30 to 1.96, or the case where the ratio H/D falls within a range of 0.90 to 3.70 and the ratio W1/W2 falls within a range of 0.40 to 0.96, a rate of luminance increase of 7% or more can be achieved.

Figure 8:
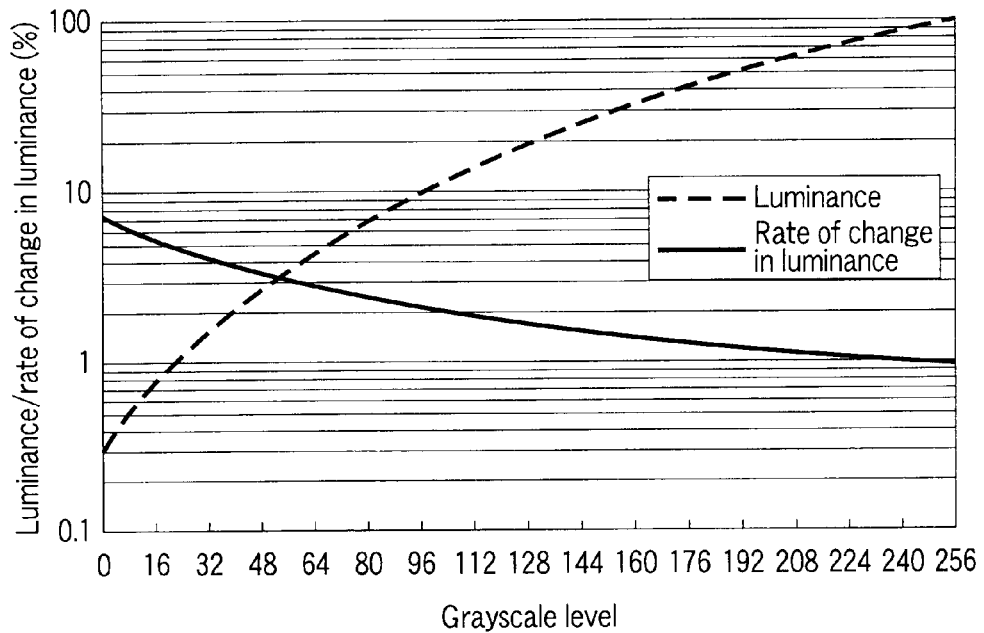
FIG. 8 is a diagram showing a relationship between a gray level and a rate of luminance change.

FIG. 8 shows a general setting for the grayscale. In the figure, the horizontal axis indicates the gray level corresponding to the luminance signal. The vertical axis indicates the luminance or the rate of luminance change of the liquid crystal display. Note that the "rate of luminance change" represents the ratio (L(N+1)−L(N))/L(N), in which L(N) is the luminance corresponding to the N-th gray level, and L(N+1) is the luminance corresponding to the N+1-th gray level.

As shown in FIG. 8, the rate of luminance change generally falls within a range of 1% to 7%. As will be apparent from this, the rate of luminance increase of 1% or more described with reference to FIG. 7 means that the increase of the contrast ratio can be clearly perceived when a grayscale image of high gray levels is displayed. On the other hand, the rate of luminance increase of 7% or more described with reference to FIG. 7 means that the increase of the contrast ratio can be clearly perceived even when a grayscale image of low gray levels is displayed.

Various modifications can be made to the liquid crystal display. FIGS. 9 to 13 show the modified examples of the liquid crystal display described with reference to FIGS. 1 to 8.

Figure 9:
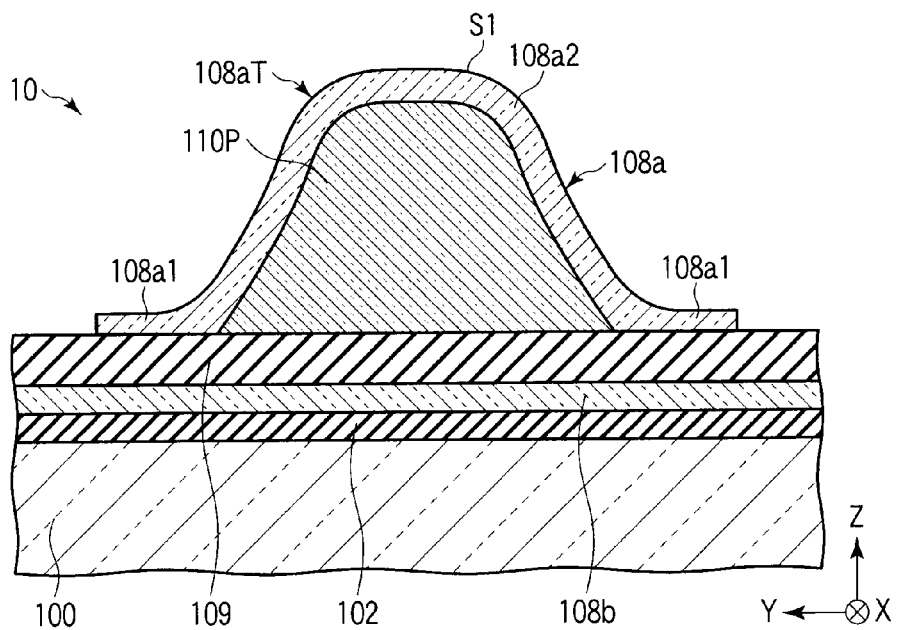
FIG. 9 is a sectional view schematically showing another example of a structure that can be employed in the electrode.

The protruding portion 110 shown in FIG. 9 has a trapezoidal cross section perpendicular to the lengthwise direction. The protruding portion 110 shown in FIG. 10 has a step pyramidal cross section perpendicular to the lengthwise direction. As above, it is not necessary that the cross section of the protruding portion 110P perpendicular to the lengthwise direction has a triangular shape.

The combtooth portion 108aT shown in FIG. 11 is provided with a slit SLT extending in the lengthwise direction of the combtooth portion 108aT. Specifically, the second portion 198a2 of the combtooth portion 108aT is provided with the slit SLT at a position corresponding to the ridge of the protruding portion 110P. When each combtooth portion 108aT is provided with the slit SLT, a transverse electric field can be generated in the vicinity of the slit SLT. Therefore, a higher contrast ratio can be achieved.

In the structure shown in FIG. 12, the protruding portion 110P is interposed between the electrode 108b and the insulating layer 109. In the structure shown in FIG. 13, the protruding portion 110P is interposed between the substrate 100 and the electrode 108b. As above, the protruding portion 110P may be placed at any position between the substrate 100 and the electrode 108a.

In the structure shown in FIG. 13, the protruding portion 110P is provided as a part of the layer 110. The layer 110 further includes a flat portion 110F in addition to the protruding portion 110P. The layer 110 can be formed using, for example, imprinting.

Figure 14:
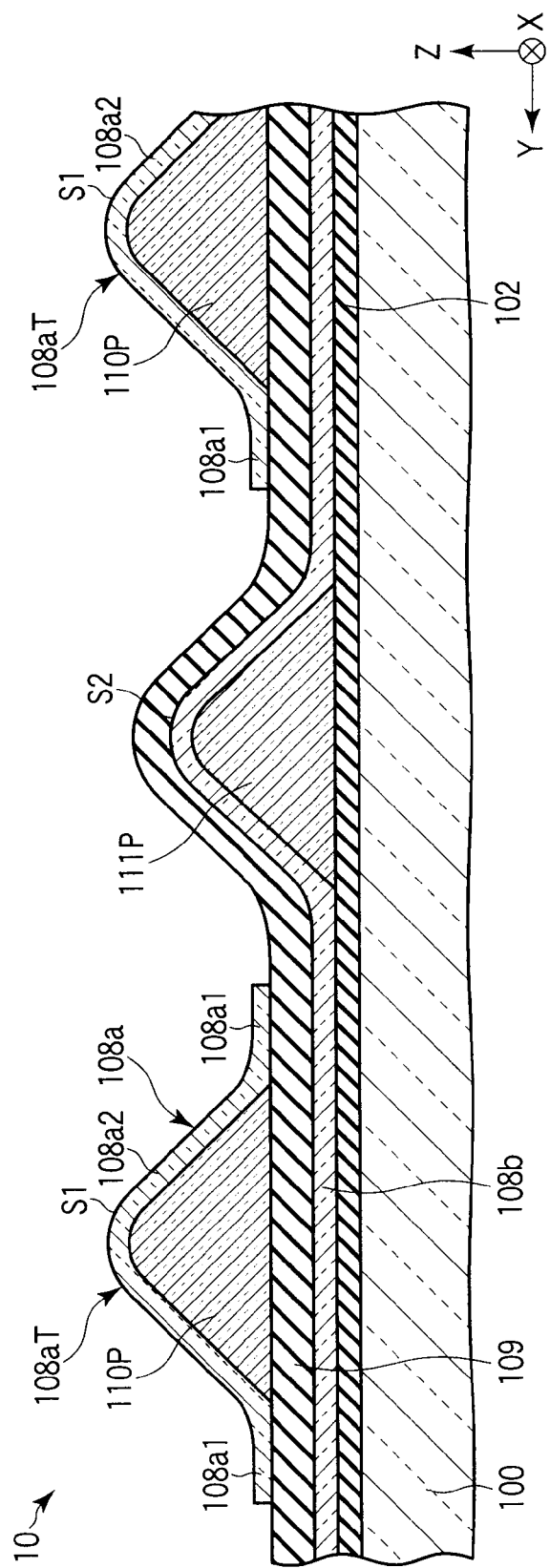
FIG. 14 is a sectional view schematically showing an example of a structure that can be employed in a liquid crystal display according to a second embodiment.

The second embodiment will be described with reference to FIG. 14. The second embodiment is the same as the first embodiment except that the array substrate 10 further includes protruding portions 111P as shown in FIG. 14.

Each protruding portion 111P is placed between the substrate 100 and the electrode 108b at a position corresponding to the space between the combtooth portions 108aT. The protruding portions 111P extend in the lengthwise direction of the protruding portions 110P and are arranged in the width direction of the protruding portions 110P. Each of the protruding portion 111P forms a convex surface S2 corresponding to the protruding portion 111P on the surface of the portion of the electrode 108b that corresponding to the space between the combtooth portions 108aT.

In each pixel PX, the protruding portions 111P may be arranged at a regular interval or irregular intervals. Here, as an example, it is supposed that the protruding portions 111P are arranged at a regular interval.

Typically, a cross section of each protruding portion 111P that is perpendicular to the lengthwise direction thereof tapers down toward the liquid crystal layer 30. Here, as an example, it is supposed that each protruding portion 111P has a triangular pole shape with one of the lateral faces parallel with the main surface of the substrate 100.

Although the protruding portions 111P may not have light-transmitting property, the protruding portions 111P typically have a light-transmitting property. The protruding portions 111P may be transparent or opaque. The protruding portions 111P may be colorless or colored. Here, as an example, it is supposed that the protruding portions 111P are colorless and transparent.

The protruding portions 111P may have electric conductivity or not. In the case where resin is used as the material of the protruding portions 111P, the protruding portions 111P typically are electrically insulating.

The size of the protruding portion 111P in the direction perpendicular to both the lengthwise direction and the Z direction, that is, the width of the protruding portion 111P is set within, for example, a range of 0.5 μm to the distance between the combtooth portions 108aT. The size of the protruding portion 111P in the Z direction, that is, the height of the protruding portion 111P is set within, for example, a range of 0.1 μm to the cell gap. The ratio of the height to the width of the protruding portion 111P is set within, for example, a range of 0.1 to 10.

In the case of employing this structure, the region in which the transverse electric field with almost uniform intensity is generated is extended with respect to the case of omitting the protruding portions 111P. Therefore, when this structure is employed, a higher contrast ratio can be achieved.

The same modifications as those described for the protruding portions 110P and the electrodes 108a with reference to FIGS. 9 to 13 can also made to the protruding portions 111P and the electrodes 108b. That is, it is not always necessary that the cross section of the protruding portion 111P perpendicular to the lengthwise direction is triangular. The electrode 108b may be provided with a slit at a position corresponding to the ridge of the protruding portion 111P. The protruding portion 111P may be placed between the substrate 100 and the insulating layer 102. Further, the protruding portion 111P may be a part of a layer that includes a flat portion.

The third embodiment will be described with reference to FIGS. 15 and 16. The third embodiment is the same as the first embodiment except that the following structure is employed in the electrodes 108b.

In each pixel PX, the electrode 108b includes combtooth portions 108bT that extend in the first direction and are arranged in the second direction. Here, the combtooth portions 108bT extend in the X direction and are arranged in the Y direction.

In each pixel PX, the combtooth portions 108bT are electrically connected to each other and form a space therebetween. Each combtooth portions 108bT faces the liquid crystal layer 30 at a position of the space between the combtooth portions 108aT. When the width of the combtooth portion 108bT is equal to or greater than the distance between combtooth portions 108aT, the influence of electric potential deviation occurred outside the display area on the image quality can be minimized.

In the case of employing this structure, the same effects as those described with reference to FIGS. 1 to 8 can be obtained.

Figure 15:
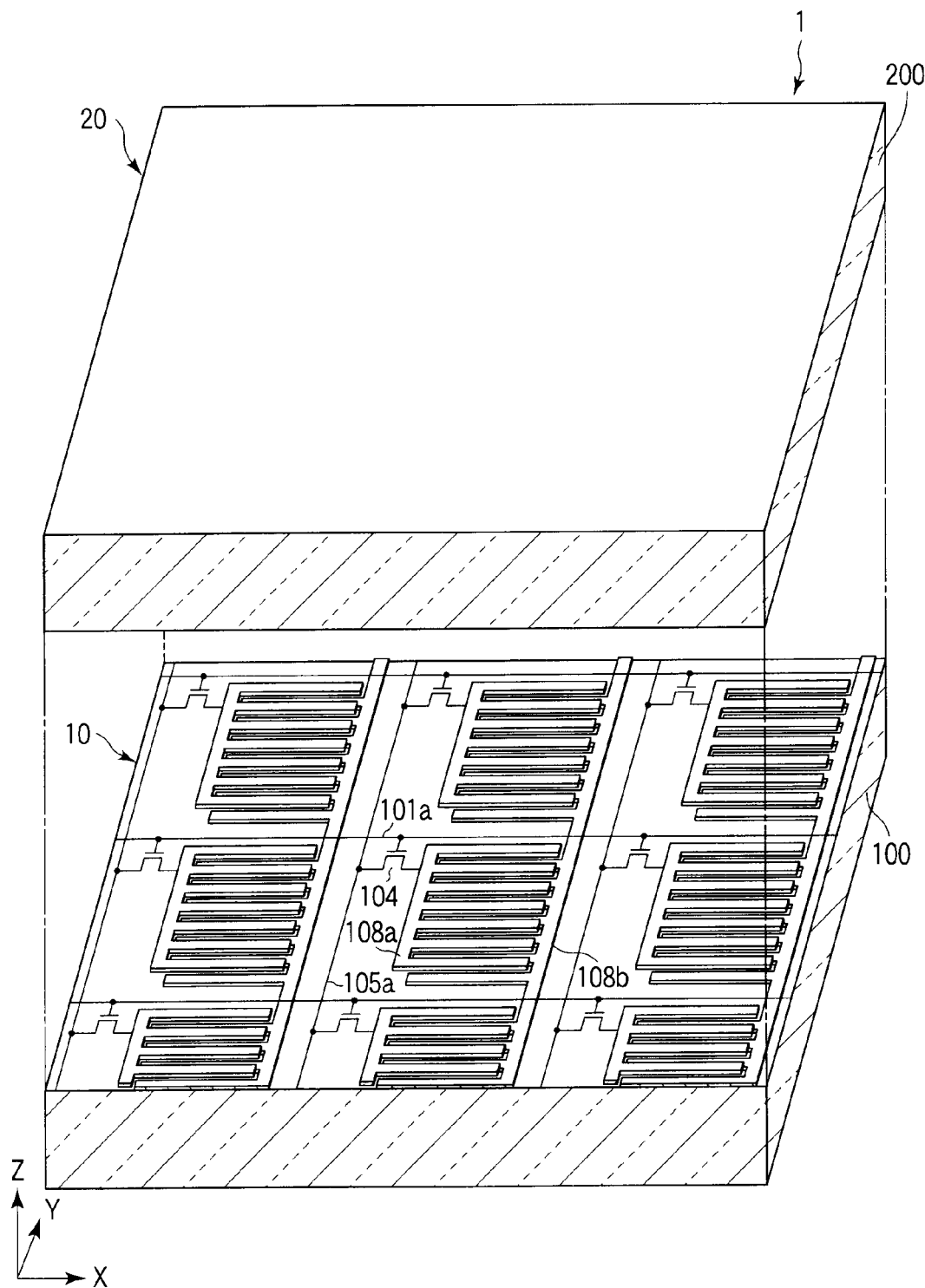
FIG. 15 is an exploded perspective view schematically showing an example of a liquid crystal display panel that can be used in a liquid crystal display according to a third embodiment.

In the case of employing the structure shown in FIGS. 15 and 16, the insulating layer 109 can be omitted as long as the electrodes 108a and 108b are electrically insulated from each other. That is, the electrodes 108a and 108b can be arranged on the insulating layer 102 such that the combtooth portions 108aT and 108bT are arranged alternately.

The protruding portions 111P described with reference to FIG. 14 may be arranged between the combtooth portions 108bT and the substrate 100. In this case, the region in which a transverse electric field with almost uniform intensity can be extended as compared with the case of omitting the protruding portions 111P. Therefore, when this structure is employed, a higher contrast ratio can be achieved.

In the case where the protruding portions 111P are arranged between the combtooth portions 108bT and the substrate 100, the same modifications as those described for the protruding portions 110P and the electrodes 108a with reference to FIGS. 9 to 13 can also be made to the electrodes 108b. That is, it is not always necessary that the cross section of the protruding portion 111P perpendicular to the lengthwise direction is triangular. The combtooth portion 108bT may be provided with a slit at a position corresponding to the ridge of the protruding portion 111P. The protruding portions 111P may be arranged between the substrate 100 and the insulating layer 102. Further, the protruding portions 111P may be parts of a layer that includes a flat portion.

The above-described liquid crystal display employs the structure for displaying an image by the normally black mode. Instead, it is possible to employ the structure for displaying an image by the normally white mode.

This liquid crystal display employs an active-matrix driving method. Instead, another driving method such as passive-matrix driving method or segment driving method may be employed.

The amount of light emitted by the backlight unit may be constant or variable. In the latter case, the amount of visible light emitted by the backlight unit may be changed according to, for example, the brightness of the external environment. Specifically, it is possible that the amount of visible light emitted by the backlight unit is reduced when the external environment is dark, and the amount of visible light emitted by the backlight unit is increased when the external environment is bright.

Examples of the above-described technique will be described below.

EXAMPLE 1

In this example, the liquid crystal display described with reference to FIGS. 1 to 6 was manufactured by the following method.

In order to form the array substrate 10, the scanning lines 101a and the auxiliary capacitance lines 101b were formed on the glass substrate 100. Chromium was used as the material of the scanning lines 101a and the auxiliary capacitance lines 101b.

The scanning lines 101a, the auxiliary capacitance lines 101b and the glass substrate 100 were covered with the insulating layer 102 made of silicon oxide. An amorphous silicon layer was formed on the insulting layer 102 and was patterned into the semiconductor layers 103. Then, the channel protection layer (not shown) made of silicon nitride was formed on a part of each semiconductor layer 103, and the ohmic layer (not shown) was formed on the semiconductor layer 103 and the channel protection layer.

Subsequently, the signal lines 105a, the source electrodes 105b and the power supply lines 105c were formed on the insulating layer 102. The counter electrodes 108b made of ITO were further formed on the insulating layer such that the electrodes 108b at least partially covered the power supply lines 105c. In order to form the counter electrodes 108b, performed were deposition of an ITO layer and patterning of the ITO layer using photolithography.

Then, the insulating layer 109 made of silicon nitride was deposited on the signal lines 105a, the source electrodes 105b, the power supply lines 105c and the counter electrodes 108b. The thickness of the insulating layer 109 was 630 nm. Contact holes were formed in the insulating layer 109 at positions corresponding to the source electrodes 105b.

The protruding portions 110P were formed on the insulating layer 109. As the protruding portions 110P, formed were triangle poles each having a cross section perpendicular to the X direction that was an isosceles triangle with the base thereof perpendicular to the Z direction. The size of the protruding portion 110P in the Y direction was 2 μm, and the height of the protruding portion 110P was 1.9 μm.

The protruding portions 110P were formed by the following method. First, a photosensitive resin layer was formed and then patterned using photolithography into linear patterns each having almost rectangular cross section. The linear patterns were heated to its glass transition temperature or higher to fluidize the resin. The protruding portions 110P each having an isosceles triangular cross section were thus obtained.

Subsequently, the pixel electrodes 108a made of ITO were formed such that the electrodes 108a filled the above-described contact holes and the combtooth portions 108aT covered the protruding portions 110P. In order to form the pixel electrodes 108a, an ITO layer as a continuous film was formed on the insulating layer 109 and the protruding portions 110P and then patterned using photolithography.

Note that each combtooth portion 108aT had a width W2 of 3 μm. The width W1 of the second portion 108a2 was 2 μm, and the height H of the second portion 108a2 was 2 μm.

In order to form the counter substrate 20, a chromium layer was formed on the glass substrate 200 and patterned into the black matrix. The color filter 220 employing the stripe arrangement was formed thereon using photosensitive acrylic resins containing red, green and blue pigments.

On the color filter 220, formed were columnar spacers (not shown) each having a height of 5 μm and 5 μm×10 μm-sized bases using photolithography. The columnar spacers were arranged to position above the signal lines 105a wherein the array substrate 10 and the counter substrate 20 were bonded together.

After cleaning the pixel electrodes 108a, a epoxy adhesive as the material of the sealing layer was applied to the main surface of the counter substrate 20 in a form of a frame using a dispenser. Note that the frame made of the adhesive was formed to have an opening to be used as an inlet. Subsequently, the array substrate 10 and the counter substrate 20 were arranged such that the pixel electrodes 108a and the color filter 220 face each other. After position adjustment, the array substrate 10 and the counter substrate 20 were bonded together and then heated to 160° C. under pressure to cure the adhesive.

Then, the empty cell thus obtained was carried into a vacuum chamber and the cell was evacuated. A liquid crystal material was injected into the cell via the inlet to form the liquid crystal layer 30. As the liquid crystal material, used was a composition containing nematic liquid crystal JC1041 manufactured by CHISSO Corporation, nematic liquid crystal 5CB manufactured by SIGMA-ALDRICH Corporation and chiral agent ZLI-4572 manufactured by MERCK Limited in proportion of 48.2 mol %, 47.4 mol % and 4.4 mol %, respectively.

Subsequently, the inlet was sealed with an epoxy adhesive. The liquid crystal cell was thus obtained. Note that the cell gap was about 5 μm.

The linear polarizers 50R and 50F were adhered on the outer face of the array substrate 10 and the outer face of the counter substrate, respectively. Specifically, the linear polarizers 50R and 50F were adhered on the array substrate 10 and the counter substrate such that their transmission axes form angles of 45° with the X or Y direction and intersect each other at right angles.

The driving circuits 2 to 4 were bonded to the array substrate 10, and then bonded to the controller 5. Further, the display panel 1 and the backlight unit were assembled together to obtain the liquid crystal display.

Next, the liquid crystal display was driven and the performance was evaluated. Specifically, the voltage applied between the pixel electrode 108a and the counter electrode 108b of each pixel PX was changed at a frequency of 30 times per second to measure the response speed. The applied voltage was changed among three values of −15V, 0V and +15V. The contrast ratio was obtained using the brightness at the applied voltage of −15V, the brightness at the applied voltage of 0V, and the brightness at the applied voltage of +15V. As a result, a response speed of 1 millisecond and a contrast ratio of 1,000:1 were achieved.

EXAMPLE 2

In this example, the structure described with reference to FIGS. 15 and 16 was employed in the counter electrodes 108b instead of employing the structure described with reference to FIGS. 1 to 6. Except for this, in this example, a liquid crystal display was manufactured by the same method as that described in Example 1.

Then, the display was driven by the same method as that described in Example 1, and the performance was evaluated. As a result, a response speed of 1 millisecond and a contrast ratio of 1,000:1 were achieved.

EXAMPLE 3

In this example, the protruding portions 110P were omitted. Except for this, a liquid crystal display was manufactured by the same method as that described in Example 1.

Then, the display was driven by the same method as that described in Example 1, and the performance was evaluated. As a result, the response speed was 1 millisecond and the contrast ratio was 980:1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display comprising:
 a liquid crystal layer exhibiting Kerr effect;
 a first electrode including combtooth portions facing one main surface of the liquid crystal layer, the combtooth portions each extending in a first direction and arranged in a second direction, the first and second directions being parallel with the main surface and crossing each other;
 a second electrode electrically insulated from the first electrode, the second electrode including a portion that faces the main surface and is positioned in a gap between the combtooth portions or that faces the main surface with the gap interposed therebetween; an insulating layer interposed between the first and second electrodes; and
 first protruding portions each extending in the first direction and arranged in the second direction,
  wherein each of the first protruding portions faces the main surface with the combtooth portion interposed therebetween such that a surface of the combtooth portion facing the main surface includes a first convex surface having a ridge shape, or
  wherein each of the first protruding portions faces the main surface with the portion of the second electrode interposed therebetween such that a surface of the portion of the second electrode facing the main surface includes a first convex surface having a ridge shape.

2. The liquid crystal display according to claim 1, wherein each of the combtooth portions including:
 a pair of first portions each extending in the first direction and arranged in the second direction, each of the first portions having a surface parallel with the first and second directions; and
 a second portion extending in the first direction between the first portions and having a surface including the first convex surface.

3. A liquid crystal display comprising:
 a liquid crystal layer exhibiting Kerr effect;
 a first electrode including combtooth portions facing one main surface of the liquid crystal layer, the combtooth portions each extending in a first direction and arranged in a second direction, the first and second directions being parallel with the main surface and crossing each other;
 a second electrode electrically insulated from the first electrode, the second electrode including a portion that faces the main surface and is positioned in a gap between the combtooth portions or faces the main surface with the gap interposed therebetween;
 first protruding portions facing the main surface with at least one of the first and second electrodes interposed therebetween, the first protruding portions each extending in the first direction and arranged in the second direction, and each of the first protruding portions forming a first convex surface having a ridge shape on a surface of the combtooth portion or a surface of the portion of the second electrode positioned at the gap; and
 an insulating layer interposed between the first and second electrodes,
 wherein each of the combtooth portions includes:
 a pair of first portions each extending in the first direction and arranged in the second direction, each of the first portions having a surface parallel with the first and second directions; and
 a second portion extending in the first direction between the first portions and having a surface including the first convex surface, and
 wherein when a height H of the combtooth portion relative to the insulating layer with respect to a thickness D of the insulating layer is supposed to be H/D, a ratio of a size W1 of the second portion in the second direction with respect to a size W2 of the combtooth portion in the second direction is supposed to be W1/W2, and the ratios H/D and W1/W2 are plotted on horizontal and vertical axes of Cartesian coordinate system, respectively, a point (H/D, W1/W2) is positioned in a region surrounded by a line segment connecting points A1 (0.10, 1.61) and A2 (0.12, 0.34), a line segment connecting the point A2 (0.12, 0.34) and a point A3 (0.18, 0.27), a line segment connecting the point A3 (0.18, 0.27) and a point A4 (2.40, 0.03), a line segment connecting the point A4 (2.40, 0.03) and a point A5 (2.55, 0.06), a line segment connecting the point A5 (2.55, 0.06) and a point A6 (3.22, 0.03), a line segment connecting the point A6 (3.20, 0.03) and a point C1 (3.70, 0.40), a line segment connecting the point C1 (3.70, 0.40) and a point C2 (3.70, 1.13), a line segment connecting the point C2 (3.70, 1.13) and a point A7 (3.60, 1.38), a line segment connecting the point A7 (3.60, 1.38) and a point A8 (3.15, 1.17), a line segment connecting the point A8 (3.15, 1.17) and a point A9 (2.80, 1.41), a line segment connecting the point A9 (2.80, 1.41) and a point A10 (2.41, 1.95), a line segment connecting the point A10 (2.41, 1.95) and a point A11 (2.26, 2.21), a line segment connecting the point A11 (2.26, 2.21) and a point C3 (2.00, 2.20), a line segment connecting the point C3 (2.00, 2.20) and a point C4 (1.03, 2.03), and a line segment connecting the points C4 (1.03, 2.03) and A1 (0.10, 1.61).

4. A liquid crystal display comprising:
a liquid crystal layer exhibiting Kerr effect;
a first electrode including combtooth portions facing one main surface of the liquid crystal layer, the combtooth portions each extending in a first direction and arranged in a second direction, the first and second directions being parallel with the main surface and crossing each other;
a second electrode electrically insulated from the first electrode, the second electrode including a portion that faces the main surface and is positioned in a gap between the combtooth portions or faces the main surface with the gap interposed therebetween;
first protruding portions facing the main surface with at least one of the first and second electrodes interposed therebetween, the first protruding portions each extending in the first direction and arranged in the second direction, and each of the first protruding portions forming a first convex surface having a ridge shape on a surface of the combtooth portion or a surface of the portion of the second electrode positioned at the gap; and
an insulating layer interposed between the first and second electrodes,
wherein each of the combtooth portions includes:
a pair of first portions each extending in the first direction and arranged in the second direction, each of the first portions having a surface parallel with the first and second directions; and
a second portion extending in the first direction between the first portions and having a surface including the first convex surface, and
wherein when a height H of the combtooth portion relative to the insulating layer with respect to a thickness D of the insulating layer is supposed to be H/D, a ratio of a size W1 of the second portion in the second direction with respect to a size W2 of the combtooth portion in the second direction is supposed to be W1/W2, and the ratios H/D and W1/W2 are plotted on horizontal and vertical axes of Cartesian coordinate system, respectively, a point (H/D, W1/W2) is positioned in a region surrounded by a line segment connecting points B1 (0.68, 1.84) and B2 (0.61, 1.68), a line segment connecting the point B2 (0.61, 1.68) and a point B3 (0.59, 1.54), a line segment connecting the point B3 (0.59, 1.54) and a point B4 (0.60, 1.23), a line segment connecting the point B4 (0.60, 1.23) and a point B5 (0.78, 0.59), a line segment connecting the point B5 (0.78, 0.59) and a point B6 (0.96, 0.30), a line segment connecting the point B6 (0.96, 0.30) and a point B7 (2.18, 0.17), a line segment connecting the point B7 (2.18, 0.17) and a point B8 (2.50, 0.42), a line segment connecting the point B8 (2.50, 0.42) and a point B9 (2.83, 0.30), a line segment connecting the point B9 (2.83, 0.30) and a point B10 (3.19, 0.21), a line segment connecting the point B10 (3.19, 0.21) and a point B11 (0.34, 0.13), a line segment connecting the point B11 (0.34, 0.13) and a point C1 (3.70, 0.40), a line segment connecting the point C1 (3.70, 0.40) and a point C2 (3.70, 1.13), a line segment connecting the point C2 (3.70, 1.13) and a point B12 (3.65, 1.24), a line segment connecting the point B12 (3.65, 1.24) and a point B13 (3.07, 0.96), a line segment connecting the point B13 (3.07, 0.96) and a point B14 (2.86, 0.98), a line segment connecting the point B14 (2.86, 0.98) and a point B15 (2.67, 1.23), a line segment connecting the point B15 (2.67, 1.23) and a point B16 (2.10, 2.20), a line segment connecting the point B16 (2.10, 2.20) and a point C3 (2.00, 2.20), a line segment connecting the point C3 (2.00, 2.20) and a point C4 (1.03, 2.03), and a line segment connecting the points C4 (1.03, 2.03) and B1 (0.68, 1.84).

5. The liquid crystal display according to claim 1, wherein each of the first protruding portions has a cross section perpendicular to the first direction that tapers down toward the liquid crystal layer, and the first convex surface has a shape corresponding to a surface of the first protruding portion.

6. The liquid crystal display according to claim 1, wherein each of the first protruding portions forms the first convex surface on the surface of the combtooth portion.

7. The liquid crystal display according to claim 6, wherein the second electrode includes the portion that faces the main surface at the gap and another portion that faces the combtooth portions with the insulating layer interposed therebetween.

8. The liquid crystal display according to claim 7, wherein each of the combtooth portions is provided with a slit extending in the first direction.

9. The liquid crystal layer according to claim 6, wherein a portion of the surface of the second electrode corresponding to the gap includes a second convex surface having a ridge shape and extending in the first direction.

10. The liquid crystal display according to claim 9, further comprising a second protruding portion facing the main surface with the second electrode interposed therebetween, the second protruding portion forming the second convex surface on the surface of the second electrode at a position corresponding to the gap.

11. The liquid crystal display according to claim 10, wherein the second protruding portion has a cross section perpendicular to the first direction that tapers down toward the liquid crystal layer, and the second convex surface has a shape corresponding to a surface of the second protruding portion.

* * * * *